US009423955B2

(12) United States Patent
Kim et al.

(10) Patent No.: US 9,423,955 B2
(45) Date of Patent: Aug. 23, 2016

(54) PREVIEWING AND PLAYING VIDEO IN SEPARATE DISPLAY WINDOW ON MOBILE TERMINAL USING GESTURES

(75) Inventors: Kyung-Lack Kim, Gyeonggi-Do (KR); Sang-Min Lee, Seoul (KR); Tae-Hun Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 902 days.

(21) Appl. No.: 12/244,539

(22) Filed: Oct. 2, 2008

(65) Prior Publication Data

US 2009/0093276 A1    Apr. 9, 2009

(30) Foreign Application Priority Data

Oct. 4, 2007    (KR) .................. 10-2007-0100030

(51) Int. Cl.
*G06F 3/0486*    (2013.01)
*G06F 3/0488*    (2013.01)
*G06F 3/0482*    (2013.01)
*H04N 21/431*    (2011.01)
*H04N 21/414*    (2011.01)

(52) U.S. Cl.
CPC ......... *G06F 3/04886* (2013.01); *G06F 3/0482* (2013.01); *G06F 3/0488* (2013.01); *H04N 21/41407* (2013.01); *H04N 21/4314* (2013.01); *H04N 21/4316* (2013.01); *G06F 2203/04808* (2013.01)

(58) Field of Classification Search
CPC ............. G06F 3/04883; G06F 3/0482; G06F 2203/04808; G06F 3/04812; H04N 21/4316
USPC ................. 715/810, 821, 863, 838

See application file for complete search history.

(56) References Cited

U.S. PATENT DOCUMENTS

| | | | |
|---|---|---|---|
| 5,119,475 A * | 6/1992 | Smith et al. .................. | 715/866 |
| 6,160,554 A * | 12/2000 | Krause .......................... | 715/804 |
| 6,237,030 B1 * | 5/2001 | Adams et al. ................ | 709/218 |
| 6,522,342 B1 * | 2/2003 | Gagnon et al. ............... | 715/716 |
| 6,668,377 B1 | 12/2003 | Dunn | |
| 6,694,487 B1 * | 2/2004 | Ilsar ............................. | 715/247 |
| 6,832,355 B1 * | 12/2004 | Duperrouzel et al. ........ | 715/788 |
| 7,444,598 B2 * | 10/2008 | Horvitz et al. ............... | 715/808 |

(Continued)

FOREIGN PATENT DOCUMENTS

| | | |
|---|---|---|
| AU | 2007100826 A4 | 9/2007 |
| WO | WO 97/12314 A1 | 4/1997 |

(Continued)

OTHER PUBLICATIONS

Scott SS32 System Operations Manual Jan. 2000.*

*Primary Examiner* — Ajay Bhatia
*Assistant Examiner* — Phoebe Pan
(74) *Attorney, Agent, or Firm* — Birch, Stewart, Kolasch & Birch, LLP

(57) ABSTRACT

A method and device for reproducing contents of a mobile terminal having a touch screen, including: displaying on the touch screen a list of items corresponding to a plurality of contents stored in the mobile terminal; detecting a touch input to an item displayed in the list; displaying on the touch screen a reproduction screen display having a location and a size corresponding to a determined touch input location; and one of reproducing an entirety of a content corresponding to the touched item and reproducing only a portion of the content corresponding to the touched item in the reproduction screen display according to a detected touch type.

14 Claims, 8 Drawing Sheets

(56) References Cited

U.S. PATENT DOCUMENTS

| | | | | |
|---|---|---|---|---|
| 7,461,343 B2* | 12/2008 | Kates | | 715/716 |
| 7,471,890 B2* | 12/2008 | Lee et al. | | 396/287 |
| 7,480,864 B2* | 1/2009 | Brook et al. | | 715/720 |
| 7,549,129 B2* | 6/2009 | Sheldon et al. | | 715/835 |
| 7,594,190 B2* | 9/2009 | Kang et al. | | 715/822 |
| 7,689,064 B2* | 3/2010 | Miksovsky et al. | | 382/294 |
| 7,705,830 B2* | 4/2010 | Westerman et al. | | 345/173 |
| 7,765,568 B1* | 7/2010 | Gagnon et al. | | 725/38 |
| 7,770,136 B2* | 8/2010 | Beeck et al. | | 715/863 |
| 7,797,641 B2* | 9/2010 | Karukka et al. | | 715/802 |
| 7,812,826 B2* | 10/2010 | Ording et al. | | 345/173 |
| 7,814,425 B1* | 10/2010 | O'Shaugnessy et al. | | 715/752 |
| 7,823,076 B2* | 10/2010 | Borovsky et al. | | 715/764 |
| 7,840,912 B2* | 11/2010 | Elias et al. | | 715/863 |
| 7,844,163 B2* | 11/2010 | Wakita et al. | | 386/241 |
| 7,853,972 B2* | 12/2010 | Brodersen et al. | | 725/40 |
| 7,907,125 B2* | 3/2011 | Weiss et al. | | 345/173 |
| 7,912,458 B2* | 3/2011 | Ramer et al. | | 455/418 |
| 7,924,271 B2* | 4/2011 | Christie et al. | | 345/173 |
| 7,956,847 B2* | 6/2011 | Christie | | 345/173 |
| 7,956,848 B2* | 6/2011 | Chaudhri | | 345/173 |
| 8,117,548 B1* | 2/2012 | Ragan | | 715/764 |
| 8,442,757 B2* | 5/2013 | Yamasaki | | 701/409 |
| 2001/0030660 A1* | 10/2001 | Zainoulline | | 345/720 |
| 2002/0059363 A1* | 5/2002 | Katz et al. | | 709/203 |
| 2002/0191028 A1* | 12/2002 | Senechalle et al. | | 345/800 |
| 2002/0196238 A1 | 12/2002 | Tsukada et al. | | |
| 2003/0107604 A1* | 6/2003 | Ording | | 345/788 |
| 2003/0112278 A1* | 6/2003 | Driskell | | 345/788 |
| 2003/0142123 A1* | 7/2003 | Malamud et al. | | 345/715 |
| 2003/0146939 A1 | 8/2003 | Petropoulos et al. | | |
| 2003/0159567 A1 | 8/2003 | Subotnick | | |
| 2003/0210281 A1* | 11/2003 | Ellis et al. | | 345/838 |
| 2004/0205514 A1* | 10/2004 | Sommerer et al. | | 715/501.1 |
| 2004/0205633 A1* | 10/2004 | Martinez et al. | | 715/526 |
| 2004/0221322 A1* | 11/2004 | Shen et al. | | 725/135 |
| 2005/0022135 A1* | 1/2005 | de Waal | | 715/788 |
| 2005/0132297 A1* | 6/2005 | Milic-Frayling et al. | | 715/745 |
| 2005/0229118 A1 | 10/2005 | Chiu et al. | | |
| 2005/0246645 A1* | 11/2005 | Beam et al. | | 715/747 |
| 2006/0015823 A1* | 1/2006 | Chao et al. | | 715/823 |
| 2006/0079326 A1* | 4/2006 | Love | | 463/31 |
| 2006/0101338 A1* | 5/2006 | Kates | | 715/716 |
| 2007/0011258 A1* | 1/2007 | Khoo | | 709/206 |
| 2007/0038718 A1* | 2/2007 | Khoo et al. | | 709/206 |
| 2007/0050778 A1* | 3/2007 | Lee et al. | | 718/107 |
| 2007/0087781 A1* | 4/2007 | Bettis et al. | | 455/556.1 |
| 2007/0115346 A1* | 5/2007 | Kim et al. | | 348/14.02 |
| 2007/0116216 A1* | 5/2007 | Carmichael et al. | | 379/114.01 |
| 2007/0129046 A1* | 6/2007 | Soh et al. | | 455/403 |
| 2007/0143711 A1* | 6/2007 | van Wyk et al. | | 715/838 |
| 2007/0168413 A1* | 7/2007 | Barletta et al. | | 709/203 |
| 2007/0186181 A1* | 8/2007 | Bok et al. | | 715/779 |
| 2007/0204238 A1* | 8/2007 | Hua et al. | | 715/838 |
| 2007/0222768 A1* | 9/2007 | Geurts et al. | | 345/173 |
| 2007/0239869 A1* | 10/2007 | Raghav et al. | | 709/224 |
| 2007/0266322 A1* | 11/2007 | Tretter et al. | | 715/716 |
| 2008/0009270 A1* | 1/2008 | Volk et al. | | 455/414.1 |
| 2008/0016459 A1* | 1/2008 | Mann et al. | | 715/781 |
| 2008/0031595 A1* | 2/2008 | Cho | | 386/108 |
| 2008/0034325 A1* | 2/2008 | Ording | | 715/838 |
| 2008/0052742 A1* | 2/2008 | Kopf et al. | | 725/34 |
| 2008/0065722 A1* | 3/2008 | Brodersen et al. | | 709/203 |
| 2008/0086688 A1* | 4/2008 | Chandratillake et al. | | 715/719 |
| 2008/0086703 A1* | 4/2008 | Flynt et al. | | 715/853 |
| 2008/0163119 A1* | 7/2008 | Kim et al. | | 715/840 |
| 2008/0165141 A1* | 7/2008 | Christie | | 345/173 |
| 2008/0165255 A1* | 7/2008 | Christie et al. | | 348/207.99 |
| 2008/0168403 A1* | 7/2008 | Westerman et al. | | 715/863 |
| 2008/0196068 A1* | 8/2008 | Tseng | | 725/62 |
| 2008/0235594 A1* | 9/2008 | Bhumkar et al. | | 715/738 |
| 2008/0263448 A1* | 10/2008 | Oppenheimer | | 715/719 |
| 2009/0019398 A1* | 1/2009 | Hansson et al. | | 715/838 |
| 2009/0024953 A1* | 1/2009 | Selig | | 715/781 |
| 2009/0030991 A1* | 1/2009 | Vakkalanka | | 709/206 |
| 2009/0048959 A1* | 2/2009 | Omura et al. | | 705/35 |
| 2009/0064056 A1* | 3/2009 | Anderson et al. | | 715/864 |
| 2009/0158198 A1* | 6/2009 | Hayter et al. | | 715/781 |
| 2010/0056221 A1* | 3/2010 | Park | | 455/566 |
| 2010/0138767 A1* | 6/2010 | Wang et al. | | 715/769 |
| 2010/0302281 A1* | 12/2010 | Kim | | 345/661 |
| 2014/0281969 A1* | 9/2014 | Kumar et al. | | 715/711 |

FOREIGN PATENT DOCUMENTS

| | | |
|---|---|---|
| WO | WO 2007/105876 A1 | 9/2007 |
| WO | WO 2007105876 A1 * | 9/2007 |

* cited by examiner

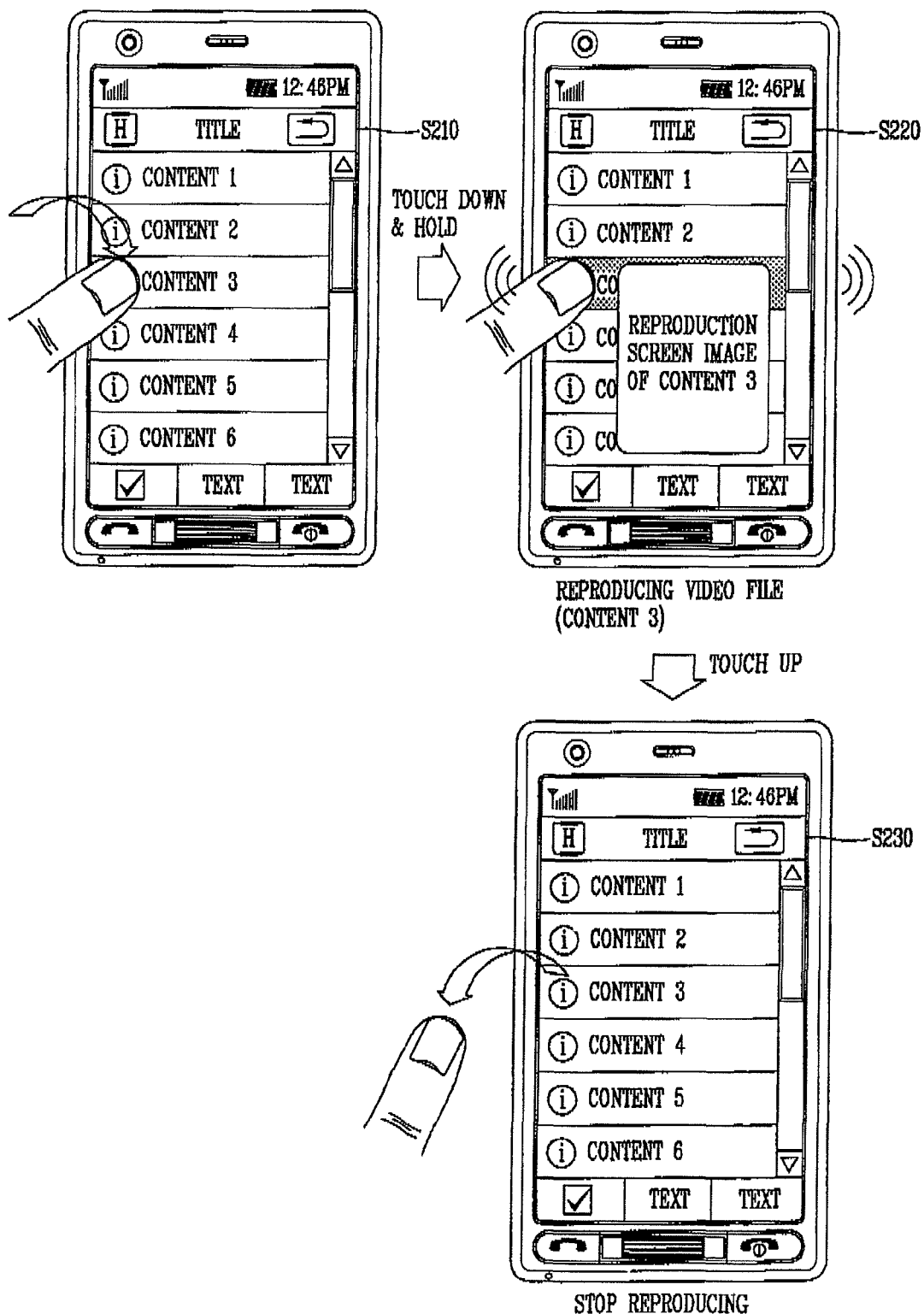

PREVIEWING AND PLAYING VIDEO IN SEPARATE DISPLAY WINDOW ON MOBILE TERMINAL USING GESTURES

CROSS REFERENCE TO RELATED APPLICATIONS

The present application claims priority to Korean Application No. 10-2007-0100030 filed in Korea on Oct. 4, 2007, the entire contents of which is hereby incorporated by reference in its entirety.

BACKGROUND OF THE INVENTION

1. Field of the Invention

The present invention relates to user interface (IS) of a mobile terminal.

2. Description of the Related Art

A mobile terminal is a device that can be carried around and has one or more functions such as to perform voice and video call communication, inputting and outputting of information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, the mobile terminal requires sufficient support in terms of hardware or software, for which numerous attempts are being made and implemented. For example, a user interface (UI) environment is provided to allow users to easily and conveniently search and select functions.

Also, as users consider their mobile terminal to be a personal portable device that may express their personality, mobile terminals are demanded to have various designs.

In terms of design, a folder type, slide type, bar type, or rotation type design may be applied for mobile terminals, and efforts have been made to provide a more convenient UI to users.

SUMMARY OF THE INVENTION

Accordingly, one object of the present invention is to address the above-noted and other problems.

Another object of the present invention is to provide a mobile terminal for displaying a contents reproduction screen display at one side of a point at which a touch is detected, when a certain touch input to select a content list is detected.

To achieve these and other advantages and in accordance with the purpose of the present invention, as embodied and broadly described herein, the present invention provides in one aspect a mobile terminal wherein when a certain touch input is detected, a screen is divided into at least four regions by using a corresponding touch point as a crossing of an x axis and a y axis, and a reproduction screen display is displayed at the largest region of the divided regions.

Still another object of the present invention is to provide a mobile terminal for discriminately performing reproducing of the entirety or a portion of content according to a type of an inputted touch.

Yet another object of the present invention is to provide a terminal for discriminating a touch input into a one-time touch and a multi-time touch and reproducing the entirety or only a portion of corresponding content.

Another object of the present invention is to provide a terminal for discriminating a touch input into a one-point touch and a multi-point touch, and reproducing the entirety or only a portion of corresponding content.

Another object of the present invention is to provide a terminal for discriminating a touch input into a short touch and a long touch, and reproducing the entirety or only a portion of corresponding content.

Another object of the present invention is to provide a terminal for discriminating a touch input into a first region touch or a second region touch, and reproducing the entirety or only a portion of corresponding content.

Another object of the present invention is to provide a terminal for reproducing corresponding content only while a touch input is detected at a particular region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 9 shows a contents reproducing method according to a fifth embodiment of the present invention.

DETAILED DESCRIPTION OF THE INVENTION

The mobile terminal according to embodiments of the present invention will now be described in detail with reference to the accompanying drawings.

Figure 1:
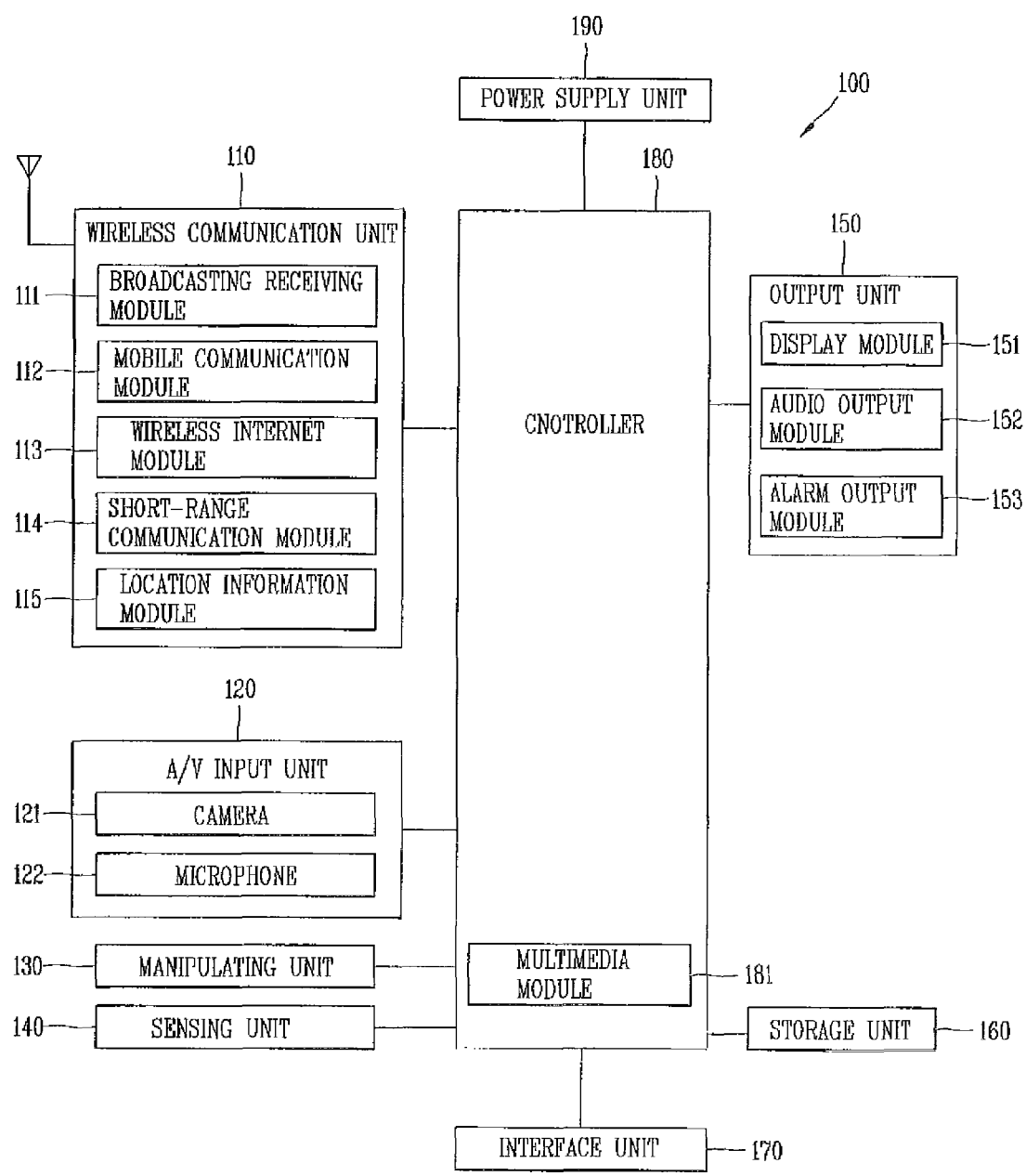
FIG. 1 is a schematic block diagram of a mobile terminal implementing an embodiment of the present invention.

FIG. 1 is a block diagram of a mobile terminal implementing an embodiment of the present invention. The mobile terminal according to the present invention will now be described in a functional prospective with reference to FIG. 1.

The mobile terminal 100 as shown in FIG. 1 may include a wireless communication unit 110, an A/V (Audio/Video)

input unit 120, a manipulating unit 130, a sensing unit 140, an output unit 150, a storage unit 160, an interface unit 170, a controller 180, and a power supply unit 190, etc. When implemented in the mobile terminal, it is understood that the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located.

The broadcast receiving module 111 receives broadcast signals and/or broadcast associated information from an external broadcast management server (or other network entity) via a broadcast channel. The broadcast channel may include a satellite channel and a terrestrial channel. The broadcast managing server may refer to a system that generates and transmits a broadcast signal and/or broadcast associated information or a server that receives a previously generated broadcast signal and/or broadcast associated information and transmits the same to a terminal. Examples of the broadcast associated information may include information regarding a broadcast channel, a broadcast program, a broadcast service provider, etc. The broadcast signal may include a TV broadcast signal, a radio broadcast signal, a data broadcast signal, and the like. Also, the broadcast signal may further include a broadcast signal combined with a TV or radio broadcast signal.

The broadcast associated information may be provided also via a mobile communication network (e.g., that operate according to standards such as 3GPP, 3GPP2, IEEE, CDMA, GSM, OMA, so-called 4G techniques, etc.) and, in this case, the broadcast associated information may be received by the mobile communication module 112.

The broadcast signal may exist ill various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive broadcast signals by using various types of broadcast systems. In particular the broadcast receiving module 111 may receive a digital broadcast signal by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 is configured to be suitable for every broadcast system that provides a broadcast signal as well as the above-mentioned digital broadcast systems. Broadcast signals and/or broadcast-associated information received via the broadcast receiving module 111 may be stored in the storage unit 160 (or other type of storage medium).

The mobile communication module 112 transmits and/or receives radio signals to and/or from at least one of a base station (e.g., access points, Node Bs, etc.), an external terminal (e.g., other user devices) and a server (or other network entities). Such radio signals may include a voice call signal, a video call signal or various types of data according to text and/or multimedia message transmission and/or reception.

The wireless Internet module 113 supports Internet access for the mobile terminal. This module may be internally or externally coupled to the terminal.

The short-range communication module 114 refers to a module for supporting short range communications. Some examples of short-range communication technology includes Bluetooth™, Radio Frequency IDentification (RFID), Infrared Data Association (IrDA), Ultra-WideBand (UWB), ZigBee™, and the like.

A GPS module 115 receives location information from a plurality of artificial satellites.

The A/V input unit 120 is configured to receive an audio or video signal. The A/V input unit 120 may include a camera 121 (or other image capture device) and a microphone 122 (or other sound pick-up device). The camera 121 processes image data of still pictures or videos obtained by an image capture device in a video capturing mode or an image capturing mode. The processed image frames may be displayed on a display module 151 (or other visual output device).

The image frames processed by the camera 121 may be stored in the storage unit 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may include various types of noise canceling (or suppression) algorithms to cancel (or suppress) noise or interference generated in the course of receiving and transmitting audio signals.

The manipulating unit 130 (or other user input device) may generate key input data from commands entered by a user to control various operations of the mobile terminal. The manipulating unit 130 allows the user to enter various types of information, and may include a keypad, a dome switch, a touch pad (e.g., a touch sensitive member that detects changes in resistance, pressure, capacitance, etc.), a jog wheel, a jog switch, and the like. In particular, when the touch pad is overlaid on the display module 151 in a layered manner, it may be called a touch screen.

The sensing unit 140 (or other detection means) detects a current status (or state) of the mobile terminal 100 such as an opened or closed state of the mobile terminal 100, a location of the mobile terminal 100, a presence or absence of user contact (i.e. touch inputs) with the mobile terminal 100, and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface with at least one external device connected with the mobile terminal 100. For example, the external devices may include wired or wireless headset ports, external power supply (or battery charger) ports, wired or wireless data ports, storage unit card ports, polls for connecting a device having an identification module, audio input/output (I/O) ports, video I/O ports, earphone ports, or the like.

The interface unit 170 may be used to receive inputs (e.g., data, information, power; etc.) from an external device and transfer the received inputs to one or more elements within the mobile terminal 100 or may be used to transfer data between the mobile terminal and an external device.

The output unit 150 is configured to provide outputs in a visual, audible, and/or tactile maimer (e.g., audio signal, video signal, alarm signal, vibration signal, etc.). The output unit 150 may include the display module 151, an audio output module 152, an alarm output module 153, and the like.

The display module 151 may output information processed in the mobile terminal 100. For example, when the mobile terminal 100 is in a phone call mode, the display module 151 may display a User Interface (UI) or a Graphic User Interface (GUI) associated with a call or other communication (such as text messaging, multimedia file downloading, etc.). When the mobile terminal 100 is in a video call mode or image capturing mode, the display module 151 may display a captured image and/or received image, a UI or GUI that shows videos or images and functions related thereto, and the like.

Meanwhile, when the display module 151 and the touch pad are overlaid in a layered manner to form a touch screen, the display module 151 may function as both an input device and an output device. The display module 151 may include at Least one of a Liquid Crystal Display (LCD), a Thin Film Transistor-LCD (TFT-LCD), an Organic Light Emitting Diode (OLED), a flexible display, a three-dimensional (3D) display, or the like. The mobile terminal 100 may include two or more display modules (or other display means) according to its embodiment. For example, the mobile terminal may include an external display module (that can be viewed even if the mobile phone is closed) and an internal display module (that can be viewed if the mobile phone is opened).

The audio output module 152 may output audio data received from the wireless communication unit 110 or stored in the storage unit 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzer or other sound generating device.

The alarm output module 153 (or other type of user notification means) may provide outputs to inform about an occurrence of an event of the mobile terminal 100. Typical events may include call reception, message reception, key or button inputs, etc. In addition to audio or video outputs, the alarm output module 153 may provide outputs in a different manner to inform about an occurrence of an event. For example, the alarm output module 153 may provide outputs in the form of vibrations (or other tactile outputs). When a call, a message, or some other incoming communication is received, the alarm output module 153 may provide tactile outputs (i.e., vibrations) to inform the user. By providing tactile outputs, the user can recognize the occurrence of various events even if his mobile phone is in his pocket. Outputs informing about the occurrence of an event may be also provided via the display module 151 or the audio output module 152.

The storage unit 160 (or other storage means) may store software programs or the like used for the processing and controlling operations performed by the controller 180, or may temporarily store data (e.g., a phonebook, messages, still images, video, etc.) that have been input or to be outputted. For a software implementation, the embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The storage unit 160 may include at least one type of storage medium including a Flash storage unit, a hard disk, a multimedia card, a card-type storage unit (e.g., SD or DX storage unit, etc), a Random Access Storage unit (RAM), a Static Random Access Storage unit (SRAM), a Read-Only Storage unit (ROM), an Electrically Erasable Programmable Read-Only Storage unit (EEPROM), a Programmable Read-Only storage unit (PROM) magnetic storage unit, a magnetic disk, an optical disk, and the like. Also, the mobile terminal 100 may cooperate with a network storage device that performs the storage function of the storage unit 160 over a network connection.

The controller 180 (such as a microprocessor or the like) is the operation subject of each embodiment of the present invention, and as such, the controller reproduces the entirety or a portion of corresponding content according to a type of a touch detected through a touch screen of the display module 151. Typically, the controller 180 controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separated from the controller 180.

The power supply unit 190 receives external power (via a power cable connection) or internal power (via the battery of the mobile phone) and supplies appropriate power required for operating respective elements and components under the control of the controller 180.

So far, the mobile terminal has been described from the perspective of its functions. Hereinafter, external elements of the mobile terminal will be described from the perspective of their functions with reference to FIGS. 2 and 3.

Mobile terminal may be implemented in a variety of different configurations. Examples of such configurations include folder-type, bar-type, swing-type, a slide type, as well as various other configurations. The following description will primarily relate to a slide-type mobile terminal. However; such description can equally apply to other types of mobile terminals.

Figure 2:
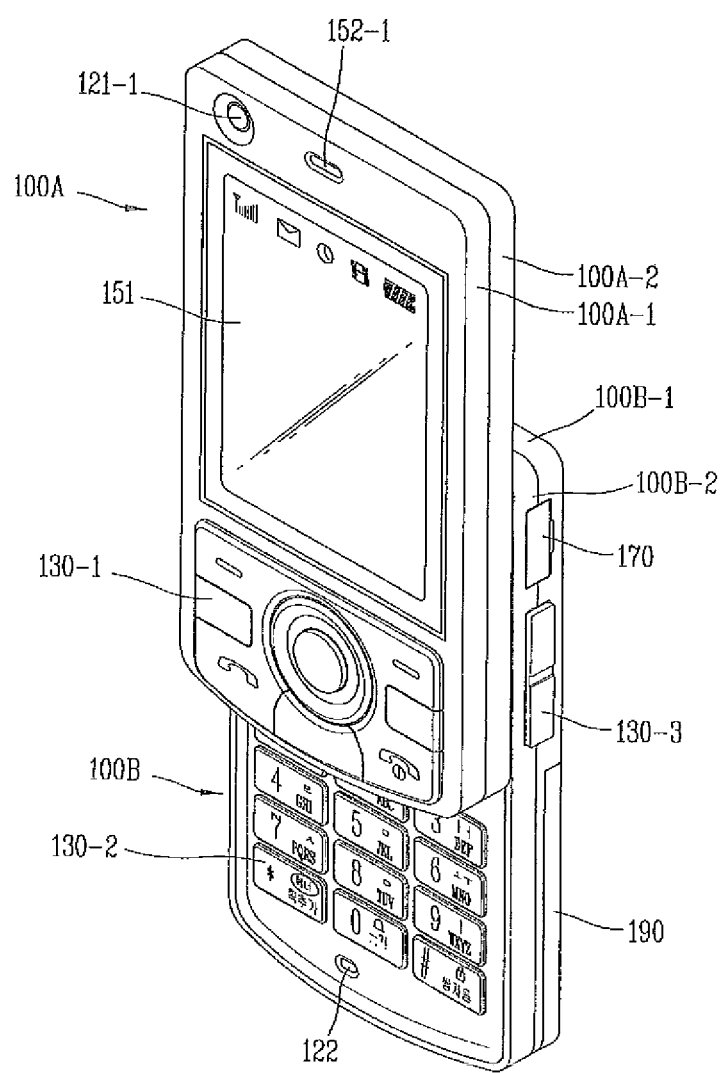
FIG. 2 is a front perspective view of a mobile terminal implementing an embodiment of the present invention.

FIG. 2 is a front perspective view of the mobile terminal implementing an embodiment of the present invention.

The mobile terminal may comprise a first body 100A, and a second body 100B configured to be slidably moved in at least one direction with respect to the first body 100A.

A state in which the first body 100A is disposed to overlap with the second body 100B may be called a closed configuration, and as shown in FIG. 2, a state in which the first body 100A exposes at least a portion of the second body 100B may be called an open configuration.

The mobile terminal may usually operate in a standby mode in the closed configuration, but this mode can be released by the user. Also, the mobile terminal may mainly function in a call mode in the open configuration, but may be changed to the standby mode according to user manipulation or after the lapse of a certain time.

At least one case (housing, casing, cover, etc.) constituting the external appearance of the first body 100A comprises a first front case 100A-1 and a first rear case 100A-2. Various electronic components may be installed inside the first front case 100A-1 and the first rear ease 100A-2. One or more intermediate cases may be additionally disposed between the first front case 100A-1 and the first rear case 100A-2.

The case can be formed by injection-molding a synthetic resin, or made of a metallic material such as stainless steel (STS) or titanium (Ti), or some other appropriate material.

The display module 151, a first audio output nodule 152-1, a first camera module 121-1 or a first manipulating unit 130-1 may be located on the first front case 100A-1 of the first body 100A.

The display module 151 may include LCD, OLED, and the like, that visually displays information.

A touch pad may be overlaid in a layered manner on the display module 151 to allow the display module 151 to function as a touch screen to input various commands for reproducing contents or information.

The first audio output module 152-1 may be implemented as a receiver or a speaker.

The first camera module 121-1 may be implemented to be suitable for a user to capture still images or video of a user and so on.

Like the first body 100A, a case constituting the external appearance of the second body 100B may be formed by a second front case 100B-1 and a second rear case 100B-2.

A second manipulating unit 130-2 may be disposed at the second body 100B, specifically, on a front face of the second front case 100B-1.

A third manipulating unit 130-3, a microphone module 122 and an interface unit 170 may be disposed at either the second front case 100B-1 or the second rear case 100B-2.

The first to third manipulating units 130-1, 130-2 and 130-3 may be called a manipulating portion 130, and various methods can be employed for the manipulation portion so long as it can be operated by the user in a tactile manner. The manipulating portion 130 can be implemented as a dome switch or touch pad that can receive user commands or information according to a pressing, pushing or touching, or implemented in the form of a dial, a wheel, a jog element, a joystick, or the like to allow user manipulation thereof.

In terms of its functions, the first manipulating unit 130-1 is used for inputting commands such as start, end, scroll or the like, and the second manipulating unit 130-2 is used for inputting numbers, characters, symbols, or the like.

The third manipulating unit 130-3 can be operated to support a so-called hot key function (e.g., speed dialing, dedicated key inputs, etc.) for activating a special function of the mobile terminal. The manipulating unit 130 performs various inputs to reproduce contents when contents reproducing is performed by a keypad input, not a touch input.

The microphone module 122 may be implemented to be suitable for receiving the user's voice and other various sounds.

The interface unit 170 may be used as a link (passage or path) through which the terminal can exchange data or the like with an external device. For example, the interface unit 170 may be implemented as one of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the external device, or the like.

The interface unit 170 may be a card socket for accommodating an external card, such as a Subscriber Identity Module (SIM), a User Identity Module (UIM), a memory card for storing information, or the like.

The power supply unit 190 for supplying power to the terminal is located at the side portion of the second rear case 100B-2. The power supply unit 190 may be) for example, a rechargeable battery that can be detached.

Figure 3:
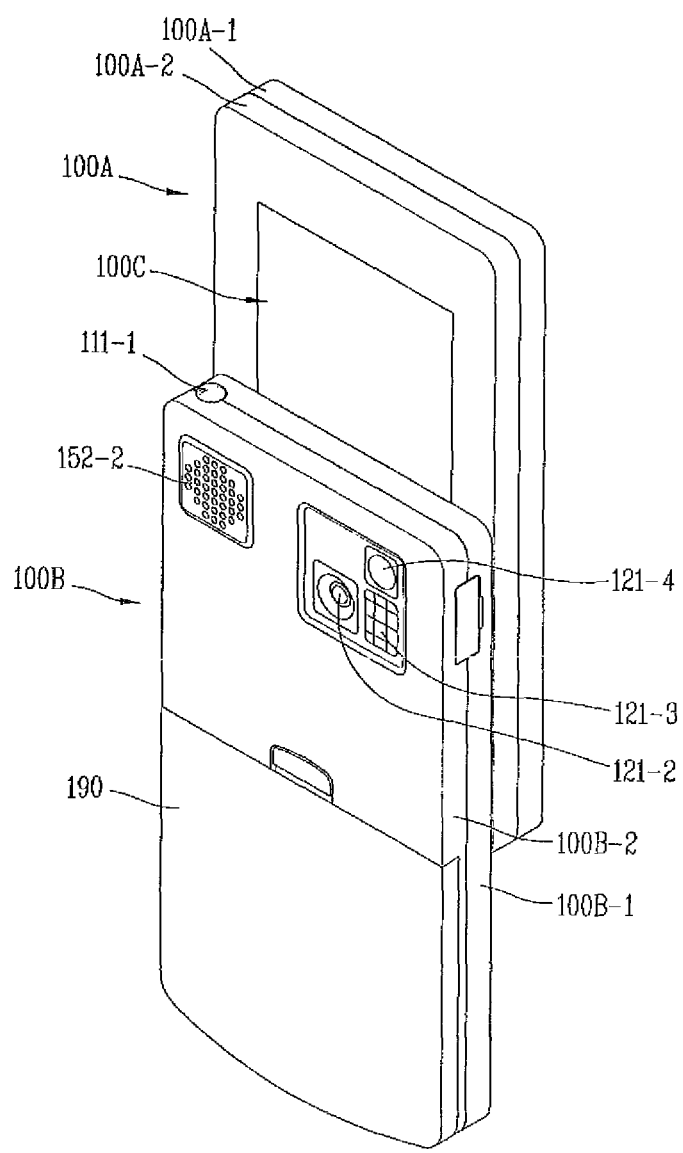
FIG. 3 is a rear perspective view of a mobile terminal implementing an embodiment of the present invention.

FIG. 3 is a rear view of the mobile terminal implementing an exemplary embodiment.

With reference to FIG. 3, a second camera module 121-2 may additionally be disposed on a rear surface of the second rear case 100B-2 of the second body 100B. The second camera module 121-2 may have an image capture direction which is substantially the opposite to that of the first camera module 121-1 (see FIG. 1), and may support a different number of pixels as that of the first camera module 121-1.

For example, the first camera module 121-1 may be used for low resolution (i.e., supporting a relatively small number of pixels) to quickly capture an image (or video) of the user's face and immediately transmit the same to the other party during video conferencing or the like. Meanwhile, the second camera module 121-2 may be used for high resolution (i.e., supporting a relatively large number of pixels) in order to capture more detailed (higher quality) images (or video) which typically do not need to be transmitted immediately.

A flash 121-3 and a mirror 121-4 may be additionally disposed adjacent to the second camera module 121-2. When an image of the subject is captured with the second camera module 121-2, the flash 121-3 illuminates the subject. The mirror 121-4 allows the user to see himself when he wants to capture his own image (self-image capturing) by using the second camera module 121-2.

The second rear case 100B-2 may further include a second audio output module 152-2. The second audio output module 152-2 may implement a stereophonic sound function in conjunction with the first audio output module 152-1 (See FIG. 2), and may be also used for sending and receiving calls in a speaker phone mode.

A broadcast signal receiving antenna 111-1 may be disposed at one side or region of the second rear case 100B-2, in addition to an antenna that supports mobile communications. The antenna 111-1 can be configured to be retractable firm the second body 100B-2.

One part of a slide module 100C that slidably combines the first body 100A and the second body 100B may be disposed on the first rear case 100A-2 of the first body 100A. The other part of the slide module 100C may be disposed on the second front case 100B-1 of the second body 100B, which may not be exposed as shown in FIG. 3.

In the above description, the second camera module 121-2 and so on is disposed on the second body 100B, but such configuration is not meant to be limited.

For example, one or more of the elements (e.g., 111-1, 121-2, 121-3, 152-2, etc.), which are disposed on the second rear case 100B-2 in the above description, may be mounted on the first body 100A, mainly, oil the first rear case 100A-2. In this case, those elements disposed on the first rear case 100A-2 can be protected (or covered) by the second body 100B in the closed configuration. In addition, even if the second camera module 121-2 is not provided, the first camera module 121-1 may be configured to rotate (or otherwise be moved) to thus allow image capturing in various directions.

Figure 4:
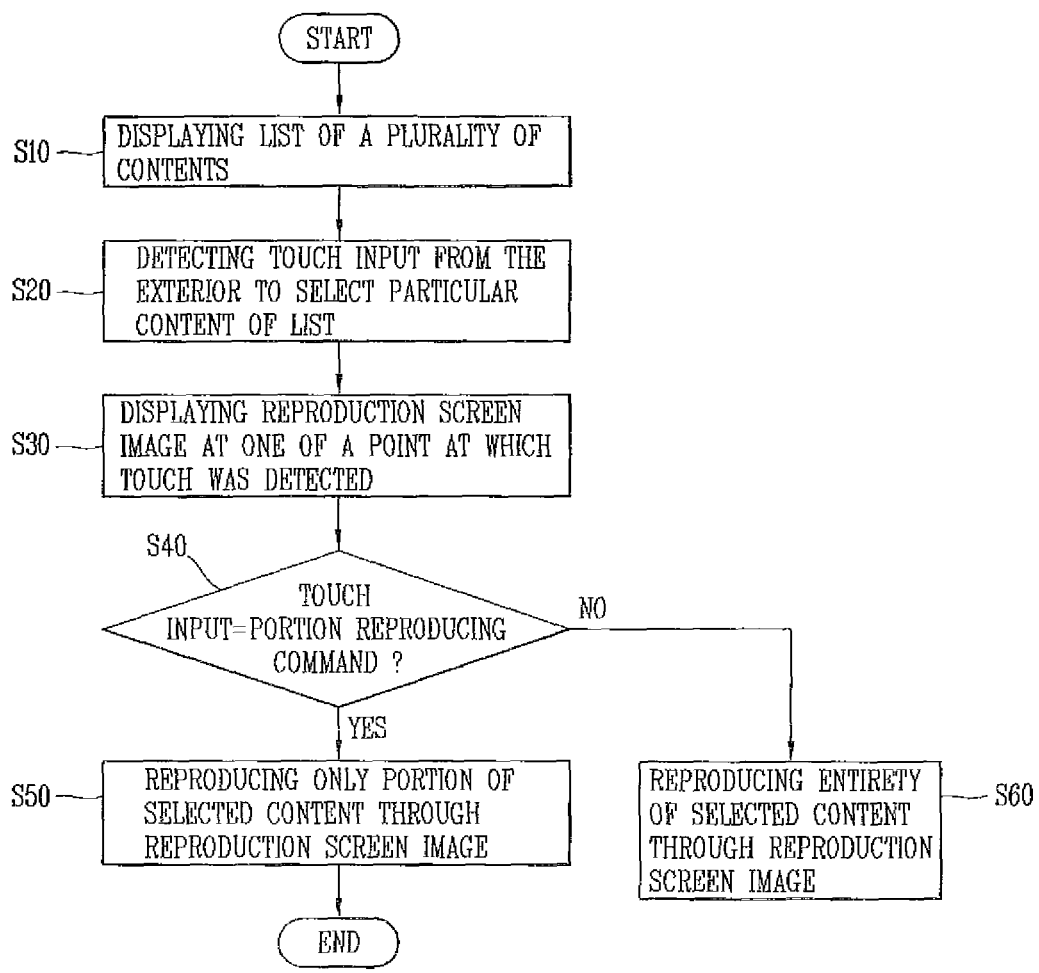
FIG. 4 is a flow chart illustrating the process of a contents reproducing method according to an exemplary embodiment of the present invention.
Figure 5:
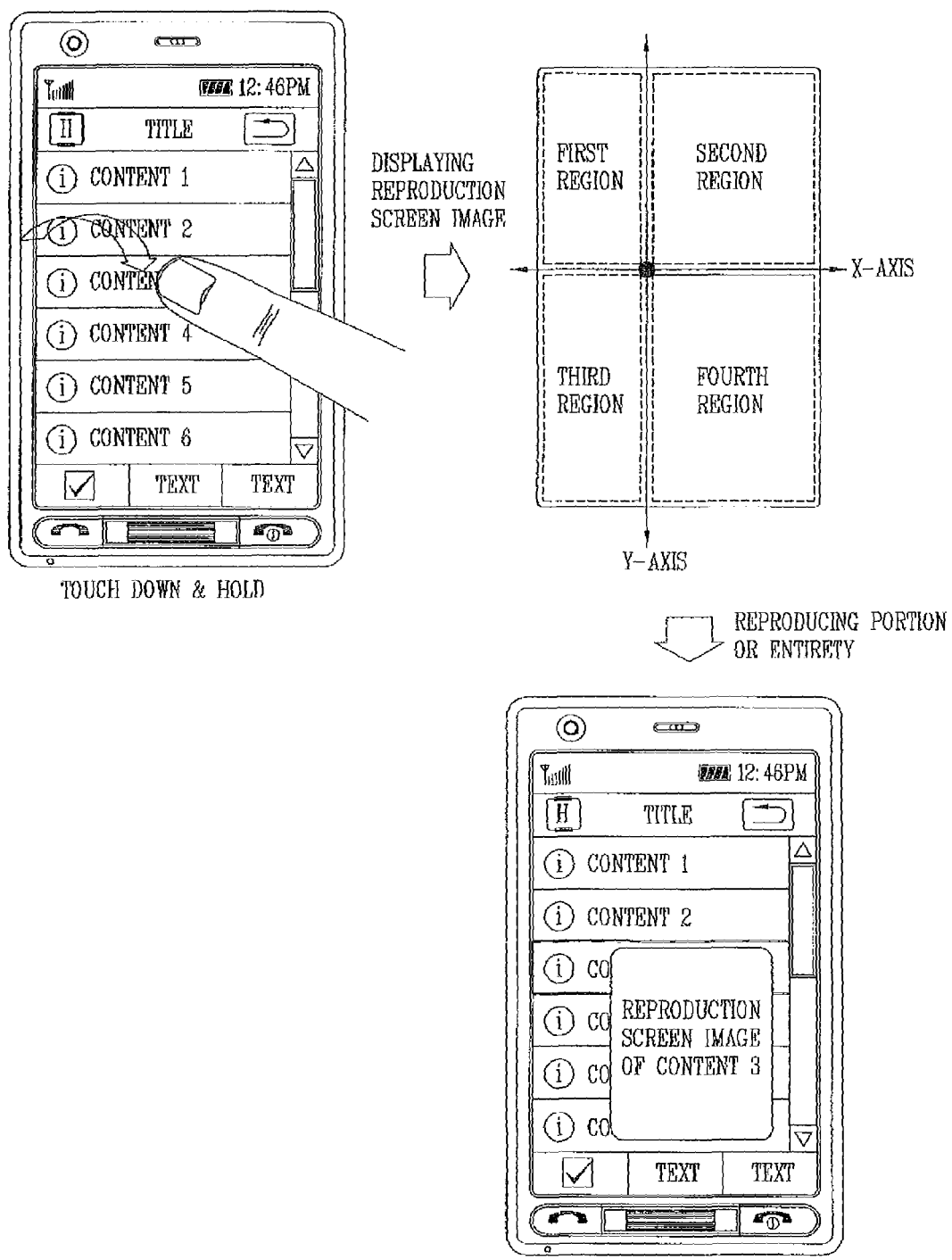
FIG. 5 is a view showing screen display configurations and touch inputs on the mobile terminal according to an embodiment of the present invention.

FIG. 4 is a flow chart illustrating the process of a contents reproducing method according to an exemplary embodiment of the present invention. FIG. 5 is a view showing a touch input and a video reproduction screen display according to an embodiment of the present invention.

The contents reproducing operation of the mobile terminal according to an embodiment of the present invention will now be described with reference to FIGS. 4 and 5.

When a contents list (e.g., a title list of video files) is displayed on a screen of the mobile terminal according to an external input such as an input by a user's touch (e.g., user's hand or stylus) or a button input (S10), the user touches a particular content of the list to select a video file he wants to watch.

When the user's touch input for selecting the video file is detected (S20), as shown in FIG. 5, the controller 180 divides the screen into four (first to fourth regions) or more regions by using the point at which the touch input was detected as a crossing of an x axis and a y axis, and generates (forms) a reproduction screen display (i.e., a certain reproduction screen image region) in the largest one (e.g., the fourth region) of the divided regions in order to output the selected video file (S30). If two or more of the largest divided regions are equal in size, the controller 180 displays the content in a predetermined one of the largest divided regions. Also, in another embodiment, the location and intersection of the x and y axes that divide the screen may be independent of the location of the touch.

As described below, controller 180 may reproduce the entirety or only a portion of the selected video file according to a type of the detected touch and output the same through the reproduction screen display (S40 to S60).

In the present invention, the controller may discriminate the detected touch input as being one of a one-time touch and a multi-time touch and accordingly reproduce a corresponding video file entirely or partially. Alternatively, the controller may discriminate the detected touch input as being one of a one-point touch and a multi-point touch, a short touch or a long touch, or a first-region touch and a second-region touch to perform the entirety or a portion of the corresponding video file.

A setting menu is provided to set types of touch inputs according to a user's preference, to thus allow the user select a desired type of touch input.

Figure 6:
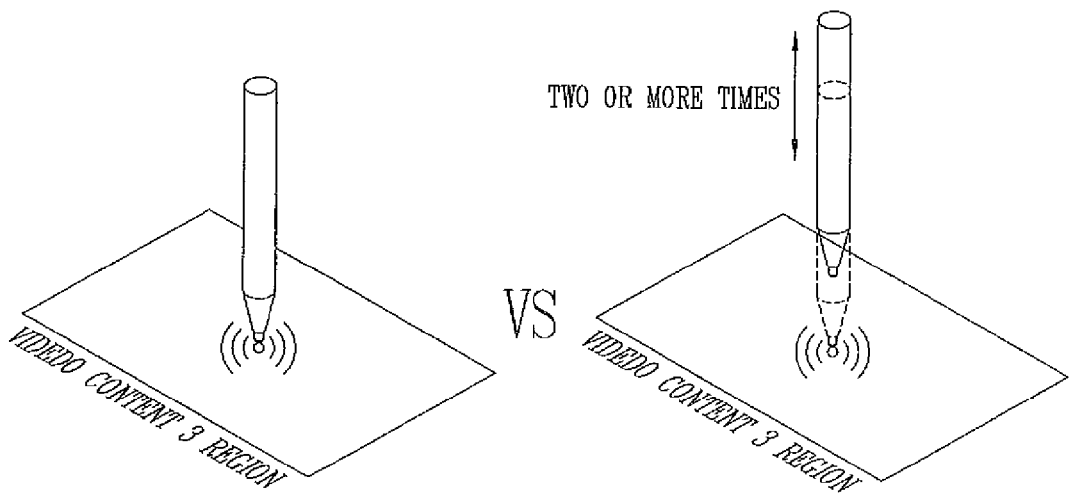
FIG. 6 shows a contents reproducing method according to a first embodiment of the present invention.

FIG. 6 shows a contents reproducing method according to a first embodiment of the present invention, in which a touch input is discriminated between a one-time touch and a multi-time touch.

As shown in FIG. 6, when a touch input is discriminated between a one-time touch and a multi-time touch in step S20, the controller 180 counts the number of touches detected via the touch screen during a predetermined time period.

During the predetermined time period, if only one touch input is detected, the controller 180 regards the one touch as a portion reproduction command and reproduces only a particular portion of a corresponding video file (e.g., content 3) on the screen. The portion of the video file may be a file for previewing (or preliminary playing).

When the user's touch input is regarded as the previewing (or preliminary play) command, the controller 180 reproduces only a portion of a predetermined video file (e.g., a time duration of the portion may be substantially five seconds to twenty seconds).

The predetermined time duration for counting the touch inputs or the reproduction time of the previewing may be factory set or may vary according to user settings.

Meanwhile, if two or more touch inputs are detected during the predetermined time period, the controller 180 regards the two or more touch inputs as the entire reproduction command (or a play command) and reproduces the video file from the beginning to the end.

The controller 180 displays the reproduced video file through the reproduction screen display.

Figure 7:
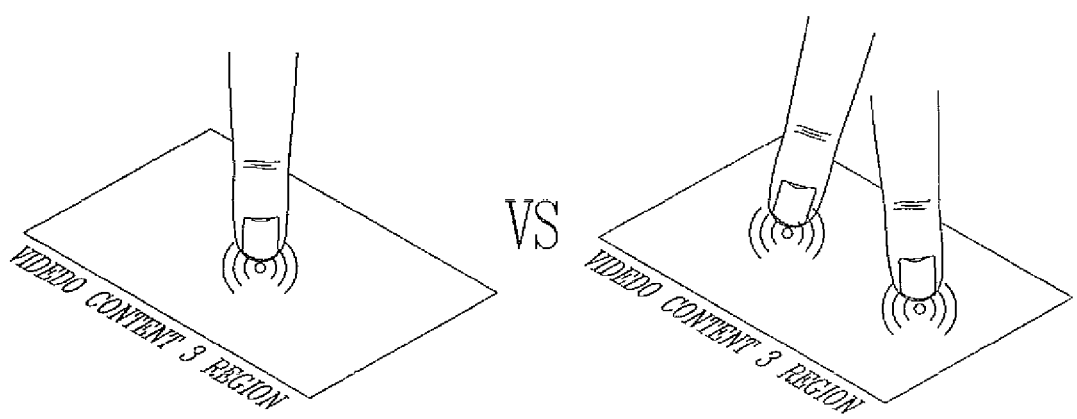
FIG. 7 shows a contents reproducing method according to a second embodiment of the present invention.

FIG. 7 shows a contents reproducing method according to a second embodiment of the present invention, in which a touch input is discriminated between a one-point touch and a multi-point touch.

As shown in FIG. 7, when a user's touch is inputted via the touch screen in step S20, the controller 180 determines whether the user's touch is detected only at one point or at two (or more) points of a content 3 region.

If the user's touch is detected only at one point of the content 3 region, the controller 180 regards it as a previewing (or a preliminary play) command and reproduces only a portion (in one embodiment, substantially five seconds or 20 seconds) of a predetermined video file. As mentioned above, the reproduction time of the previewing may vary according to user settings.

Meanwhile, if the user's touch is detected at two or more points of the content 3 region, the controller reproduces the video file, namely, the content 3, from the beginning to the end.

Likewise in the second embodiment of the present invention, if the user's touch is detected at two or more points of the selected content region, the video reproduction screen display may be formed at one side of a touch point which has been most quickly inputted temporally or a finally inputted touch point as a crossing of the x and y axes.

A contents reproducing method according to a third embodiment of the present invention discriminates between a short touch and a long touch (step S20).

In the third embodiment of the present invention, the controller 180 measures a touch time of the user inputted via the touch screen. The short touch refers to a general touch input of users. Namely, it refers to a user's touch with the screen (the content 3 region) for a short time. The long touch refers to a user's touch staying on the surface of the screen (content 3 region) for more than a certain time period.

If the user input is determined to be a short touch, the controller 180 regards the touch as a previewing (or preliminary play) command and reproduces only a certain interval (in one embodiment, substantially five seconds to twenty seconds) of the contents 3. The certain time for determining the long touch or the reproduction time of previewing may vary according to user settings.

Meanwhile, if a user input is determined to be a long touch, the controller 180 reproduces the video file, namely, the content 3, from the beginning to the end.

The reproduced video file is displayed through the certain reproduction screen display.

Figure 8:
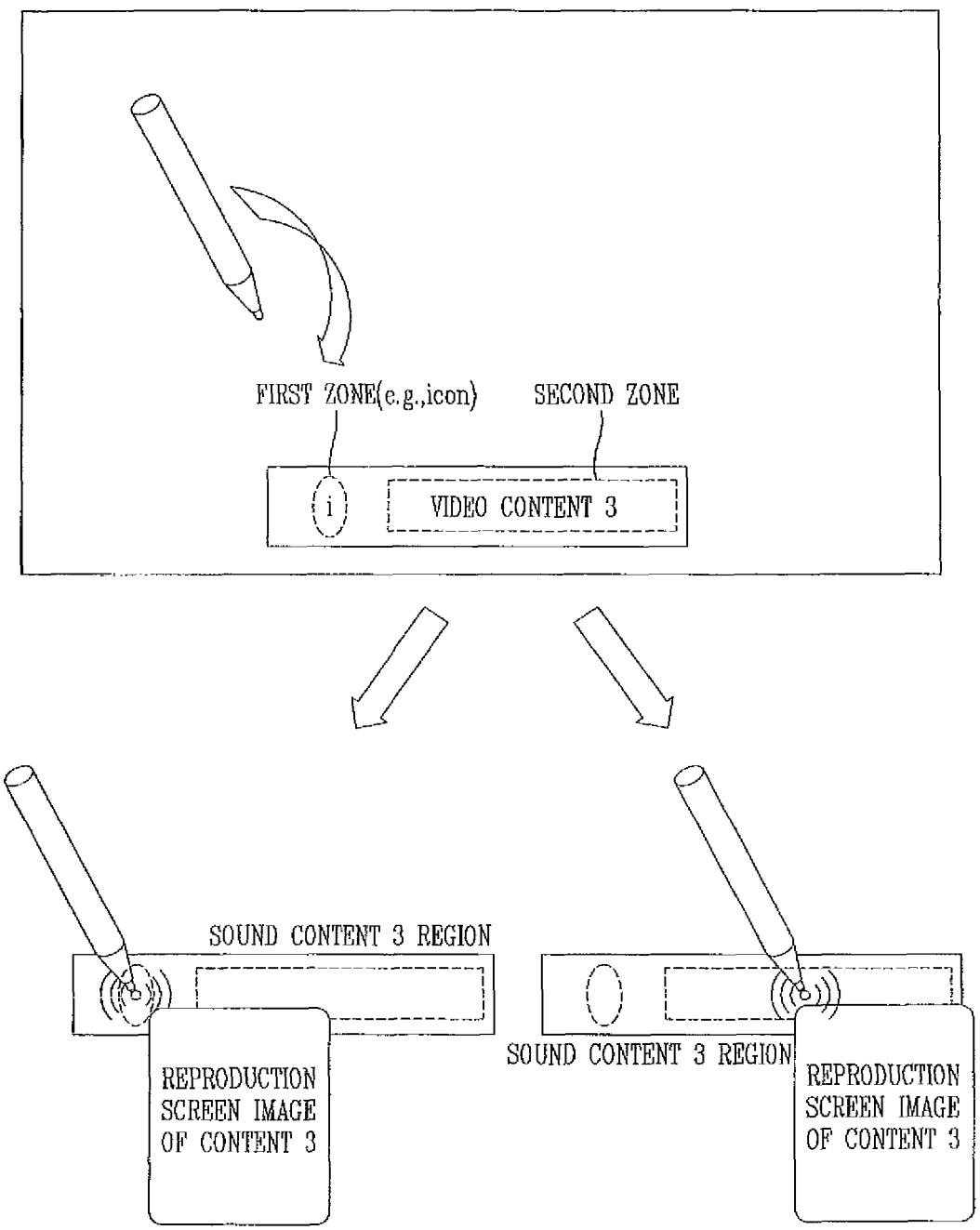
FIG. 8 shows a contents reproducing method according to a fourth embodiment of the present invention.

FIG. 8 shows a contents reproducing method according to a fourth embodiment of the present invention, in which a touch input is discriminated between a touch to a first zone (first zone touch) and a touch to a second region (second region touch).

As shown in FIG. 8, when a user touch is inputted via the touch screen in step S20, the controller determines whether the user touch is detected at a first zone (e.g., icon 'i') or at a second region (e.g., title of a video file, namely, content 3 region).

If the user touch is detected at the region ('i') of the icon, the controller 180 regards it as a previewing (or preliminary play) command and reproduces only a certain interval (substantially five seconds to twenty seconds) of the video file (e.g., the content 3). As mentioned above, the reproduction time of previewing may vary depending on user settings.

Meanwhile, if the user touch is detected at the second region corresponding to the title of the video file, the controller reproduces the video file, namely, the content 3, from the beginning to the end.

The reproduced video file is displayed through the certain reproduction screen region.

In a different embodiment, the video file may be reproduced only while a touch is detected al the icon region (i) (a fifth embodiment of the present invention). With reference to FIG. 9, the controller according to the fifth embodiment of the present invention may reproduce the video file only while the user puts his hand (or a stylus, etc.) on a particular region such as the icon region (i) (S220), and if the user puts off his hand, the controller stops reproducing of the video file (S210 and S230). Likewise in the example as shown in FIG. 8, if the user touches the second region corresponding to the title part of the video file, the controller reproduces the video file from the beginning to the end.

In the embodiments of the present invention as described above, an external input (e.g., a user input) is performed through the touch screen, but the present invention is not limited thereto and the sound reproducing method according to the present invention can be also implemented with a button input using a keypad in the same manner. Namely, the entire reproducing and a portion reproducing may be discriminately performed according to types of button inputs (e.g., one time button input vs. multi-time button input, a short button input vs. a long button input, and the like).

As so far described, the mobile terminal according to the present invention displays selected video content at a proper position with a maximized screen size, and unlike the related art in which a soft key should be provided to perform a portion reproducing (e.g., previewing or a preliminary play, etc.) of contents, and the portion reproducing is performed by performing at least two or more steps, the mobile terminal according to the present invention can discriminately perform a portion reproducing and the entire reproducing of contents effectively and quickly.

In addition, because whether to perform contents partially or entirely is determined according to a type of a detected touch, contents desired by the user can be effectively searched and reproduced.

The procedures described above relative to FIGS. 6-9 may be performed on the divided screen shown in FIG. 5. However, in alternative embodiments, the procedures described above relative to FIGS. 6-9 may be performed on an undivided screen or a screen divided via a different mechanism.

As the exemplary embodiments may be implemented in several forms without departing from the characteristics thereof it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
   a touch screen;
   a storage unit; and
   a controller configured to:
   display a list including at least one content indicating at least one video file stored in the storage unit on the touch screen, wherein each of the at least one content is associated with a corresponding one of the at least one video file,
   display a reproduction screen for a video file stored in the storage unit on the list in response to an initial detection of an input applied to content associated with the video file on the touch screen, the reproduction screen not including the information indicating a title of the video file,
   reproduce a portion of the video file on the reproduction screen only while the input applied to the content is detected since the initial detection of the input and remove the reproduction screen when the input applied to the content is no longer detected, and
   reproduce an entirety of the video file in response to a subsequent touch input thereof,
   wherein a portion of the reproduction screen is overlapping a portion of the content onto which the input is applied, and the other portion of the reproduction screen is overlapped with a portion of another content within the list,
   wherein display position of the reproduction screen is adaptively varied in response to a position of the input applied to the content, and
   wherein the displaying the reproduction screen comprises:
   dividing the touch screen into four regions by using a point at which the input applied to the content is detected as a crossing of an x-axis and a y-axis; and
   selecting a largest region of the four regions as the reproduction screen, wherein the reproducing the video file is performed only on the reproduction screen.

2. The mobile terminal of claim 1, wherein a size of the reproduction screen is larger than a display size of the content associated with the video file.

3. The mobile terminal of claim 1, wherein the controller is configured to reproduce a preview or a preliminary play of the video file on the reproduction screen.

4. The mobile terminal of claim 1, wherein the reproduction screen is formed in a rectangular shape.

5. The mobile terminal of claim 1, further comprising:
   a stylus pen configured to enter the input applied to the content.

6. A method for reproducing contents of a mobile terminal, the method comprising:
   displaying a list including at least one content indicating at least one video file stored in a storage unit of the mobile terminal on a touch screen of the mobile terminal, wherein each of the at least one content is associated with a corresponding one of the at least one video file;
   displaying a reproduction screen for a video file stored in the storage unit on the list in response to an initial detection of an input applied to content associated with the video file on the touch screen, the reproduction screen not including the information indicating a title of the video file;
   reproducing a portion of the video tile on the reproduction screen only while the input applied to the content is detected since the initial detection of the input and removing the reproduction screen when the input applied to the content is no longer detected; and
   reproducing an entirety of the video file in response to a subsequent touch input thereof, wherein a portion of the reproduction screen is overlapping a portion of the content onto which the input is applied, and the other portion of the reproduction screen is overlapped with a portion of another content within the list, wherein a display of the reproduction screen is adaptively varied in response to a position of the input applied to the content, and wherein the displaying the reproduction screen comprises:

dividing the touch screen into four regions by using a point at which the input applied to the content is detected as a crossing of an x-axis and a y-axis; and selecting a largest region of the four regions as the reproduction screen, wherein the reproducing the video file is performed only on the reproduction screen.

7. The method of claim 6, wherein a size of the reproduction screen is larger than a display size of the content associated with the video file.

8. The method of claim 6, wherein the reproducing the video file comprises reproducing a preview or a preliminary play of the video file on the reproduction screen.

9. The method of claim 6, wherein the reproduction screen is formed in a rectangular shape.

10. The method of claim 6, wherein the displaying the reproduction screen comprises:

dividing the touch screen into two regions by using a point at which the input applied to the icon is detected as a crossing of an x-axis; and selecting a largest region of the two regions as the reproduction screen, wherein the reproducing the video file is performed only on the reproduction screen.

11. The method of claim 10, wherein the reproduction screen is formed on a region above the point at which the input is applied if a screen space above the point is larger than a screen space below the point.

12. The method of claim 10, wherein the reproduction screen is formed on a region below the point at which the input is applied if a screen space below the point is larger than a screen space above the point.

13. The method of claim 10, wherein the reproduction screen is formed on a region par with the point at which the point is applied if a screen space above the point is about equal to a screen space below the point.

14. A mobile terminal, comprising:
a touch screen;
a storage unit;
a stylus pen; and
a controller configured to:

display a list including at least one content indicating at least one video file stored in the storage unit on the touch screen, wherein each of the at least one content is associated with a corresponding one of the at least one video file, display a reproduction screen for a video file stored in the storage unit on that list in response to an initial detection of an input applied to content associated with the video file on the touch screen using the stylus pen, the reproduction screen not including the information indicating a title of the video file, reproduce a portion of the video file on the reproduction screen only while the input applied to the content is detected since the initial detection of the input and removes the reproduction screen when the input applied to the content is no longer detected, and reproduce an entirety of the video file in response to a subsequent touch input thereof, wherein a portion of the reproduction screen is overlapping a portion of the content onto which the input is applied, and the other portion of the reproduction screen is overlapped with a portion of another content within the list, wherein a display position of the reproduction screen is adaptively varied in response to a position of the input applied to the content, and wherein the displaying the reproduction screen comprises:

dividing the touch screen into four regions by using a point at which the input applied to the content is detected as a crossing of an x-axis and a y-axis; and selecting a largest region of the four regions as the reproduction screen, wherein the reproducing the video tile is performed only on the reproduction screen.

* * * * *